United States Patent [19]

Face, Jr. et al.

[11] Patent Number: 6,101,880
[45] Date of Patent: *Aug. 15, 2000

[54] FEEDBACK-RESPONSIVE PIEZOELECTRIC VIBRATING DEVICE

[75] Inventors: Samuel A Face, Jr., Norfolk; Glenn F. Rogers, Hampton; Richard P. Bishop, Fairfax Station, all of Va.

[73] Assignee: Face International Corp., Norfolk, Va.

[*] Notice: This patent is subject to a terminal disclaimer.

[21] Appl. No.: 09/047,776

[22] Filed: Mar. 25, 1998

Related U.S. Application Data

[60] Provisional application No. 60/045,047, Apr. 28, 1997.

[51] Int. Cl.[7] ................................................. G01H 1/00
[52] U.S. Cl. ......................................................... 73/579
[58] Field of Search ............................ 73/579, 581, 582, 73/596, 602, 611

[56] References Cited

U.S. PATENT DOCUMENTS

| | | | |
|---|---|---|---|
| 5,520,862 | 5/1996 | Face, Jr. et al. | 264/69 |
| 5,527,175 | 6/1996 | Face, Jr. et al. | 425/135 |
| 5,814,232 | 9/1998 | Face, Jr. et al. | 210/739 |

*Primary Examiner*—Hezron Williams
*Assistant Examiner*—Helen C. Kwok
*Attorney, Agent, or Firm*—Stephen E. Clark

[57] ABSTRACT

A method is disclosed for advantageously modifying the texture or character of a plastic work material by applying acoustic energy at the work material's natural resonant frequency via a transducer assembly including vibrating the transducer assembly in air to determine the natural resonant frequency of the transducer assembly; determining the natural resonant frequency of the work material and the transducer assembly together; subtracting the natural resonant frequency of the transducer assembly from the natural resonant frequency of the work material and the transducer assembly together to determine the natural frequency of the work material; and applying acoustic energy to the work material at the determined natural frequency of the work material. The transducer assembly includes piezoelectric actuators which provide the acoustic energy.

3 Claims, 13 Drawing Sheets

FEEDBACK-RESPONSIVE PIEZOELECTRIC VIBRATING DEVICE

This application claims benefit of Provisional Appln. No. 60/045,047 filed Apr. 28, 1997.

BACKGROUND OF THE INVENTION

1. Field of the Invention

The present invention relates to piezoelectrically actuated vibrating devices. More particularly the present invention relates to feedback-responsive piezoelectric vibrating devices by which vibrational energy may be introduced into heterogeneous plastic work materials to affect the physical or chemical character of the work materials.

2. Description of the Prior Art

The present invention is a unique vibrational energy producing device which may be advantageously used in a preferred embodiment of the invention to modify the texture or character of a heterogeneous plastic or slurry work material.

For illustrative purposes, the following disclosure describes an application of the preferred embodiment of the invention wherein acoustic energy generated within the device is introduced into a plastic concrete mass in order to advantageously affect physical and chemical properties of the plastic concrete mass. It will be understood, however, that similar devices constructed in accordance with the present invention may be used to advantageously modify the texture or character of many other work materials, particularly plastic or wet materials such as plaster, wet soil, coal, sewer sludge, cement and the like.

It will also become apparent from the following disclosure that similar devices constructed in accordance with the present invention may be used in many applications where it is advantageous or desirable to efficiently pass acoustic waves into work media for purposes other than modifying the character of the work material.

It is often beneficial to work a plastic material into a more desirable state before use or disposal of that material. For example, the prior art teaches that vibrational energy may be introduced into work materials to produce effects such as dewatering or consolidation of the work materials. A problem with prior methods of introducing vibrational energy into such materials is associated with the lack of control of the vibrators, per se, and the lack of control of the vibrations which they produce.

One advantageous application of introducing vibrational energy into plastic work materials, such as concrete, is to expeditiously consolidate the material in order to produce an end product having as nearly a uniform density as possible, by encouraging and assisting the upward migration of liquids (e.g. water) and gases (e.g. air) from the plastic work material which would otherwise migrate slowly or not at all. Entrapment of air and water weakens concrete and like materials, and the slow migration of the air and water would disadvantageously increase the time required to place and finish a plastic concrete mass.

Prior art methods associated with the dewatering of work materials mostly teach devices which use "dumb" vibrators. In this context, the term "dumb vibrators" means vibrators which generate vibrational energy either at random frequencies or at specific predetermined frequencies, regardless of, and non-responsive to, the local properties of the work material. With prior methods the work material (e.g. plastic concrete) typically is simply shaken at a relatively low frequency in order to cause some of the water and air to rise to the surface. Internal combustion engine vibrators are typically used in the prior art in order to generate the vibrations. These prior methods of vibrating work materials are very inefficient, and often have little or no effect on the work material.

U.S. Pat. No. 5,527,175 to Face et al teaches a method for introducing vibrational energy into plastic concrete structures at or near the natural resonant frequency of the work material (i.e. plastic concrete) to expedite the consolidation and setting of the plastic concrete. Various schemes, for example eccentrically weighted motors and magnetostrictive actuators, are proposed for generating vibrations at the resonant frequencies of the work material. Problems with eccentrically weighted motors are that they are incapable of generating vibrations at high frequencies (i.e. greater than 100 Hz), the frequency of vibrations cannot be readily varied or fine tuned, and the device itself is typically cumbersome, very heavy, and requires excessive maintenance, as is necessary when working in the resonant frequency range of many plastic work materials.

Another problem with magnetostrictive vibrators is that they are fragile. In addition, magnetostrictive vibrators tend to degrade over time. That is, over extended periods of time the vibrational characteristics of the output of a magnetostrictive device change for a given input to the device. Also, magnetostrictive vibrators are expensive, and they inherently require the generation of a magnetic field in order to operate (which may be potentially damaging in some applications).

U.S. Pat. No. 5,527,175 teaches a method for determining the frequency of vibrational energy to be imparted into the work material corresponding to the natural resonant frequency of the work material. U.S. Pat. No. 5,527,175 teaches providing sensors which are in electrical communication with a processor unit. Based upon data provided by the sensors about how much power is being expended to run the vibrators, the processor unit selects a preferred frequency corresponding to that frequency at which the least amount of power is required to vibrate the work material.

A problem associated with selecting the vibrational frequency using the method taught in U.S. Pat. No. 5,527,175 is that the processor unit is inherently affected not only by the natural frequency of the concrete, but also the natural resonant frequency of the apparatus itself. Thus the frequency of vibrations which is typically selected using the method taught in the U.S. Pat. No. 5,527,175 inherently corresponds to that frequency at which the least amount of power is required to vibrate both the concrete work mass and the vibrating apparatus itself. It will be appreciated that in certain instances the natural resonant frequency of the work material per se will not be the same as the natural frequency of the vibrating apparatus and the work material combined.

Thus it would be desirable to provide a device that is capable of efficient application of "smart" vibrations to a work material at frequencies corresponding to a local resonant frequency of the work material and independent of the natural frequency of the vibrator apparatus itself. In this context "smart vibrations" means vibrators which generate vibrational energy at varying frequencies, wherein such frequencies are varied in a controlled fashion in response to sensed local properties of a work material.

SUMMARY OF THE INVENTION

The present invention provides a tool which advantageously uses smart vibrations produced by piezoelectric actuators to modify the texture or character of a plastic work material. In a preferred embodiment of the invention the device is positioned adjacent an exposed surface of a work material in order to effectively apply the vibrational energy to the work material. The invention provides a device which uses smart, efficient, durable vibrators for application of vibrational energy at an optimal frequency to a work material and which overcomes the aforementioned disadvantages of the prior art.

The present invention advantageously uses electrically active materials to apply vibrations to a work material. The vibratory action of the tool is generated by one or more piezoelectric elements or the like which, when energized, vibrate at a high frequency. In the preferred embodiment of the invention, vibrations are transferred through a blade at the bottom of the tool and into plastic concrete (or other plastic work material) at a frequency corresponding to a local natural frequency of the work material. This continuous introduction of vibrations causes air and water to rise to the surface of the concrete and causes the concrete to consolidate from the bottom up. During operation, as the concrete consolidates, the optimal application frequency is continually determined, and changed accordingly, via a feedback loop.

Accordingly, it is a primary object of the present invention to provide a method and apparatus for applying "smart" vibrations to a work material so as to advantageously affect the character of the work material.

It is another object of the present invention to provide a tool of an automatically vibrating variety wherein substantial vibratory energy is imparted to a work material surface.

It is another object of the present invention to provide a tool of the character described which is capable of applying vibrations to a work material over a wide range of frequencies.

It is another object of the present invention to provide a tool of the character described in which the vibratory producing elements are small, durable and inexpensive as compared with prior devices.

It is another object of the present invention to provide a tool of the character described in which vibrational energy is advantageously introduced into the work material so as to establish a standing wave in the work material.

It is yet another object of the present invention to provide a tool of the character described in which the device continuously changes the application frequency so as to closely correspond to a frequency necessary to establish a standing wave in the work material.

It is a further object of the present invention to provide a tool of the character described in which the vibrational energy is generated by one or more piezoelectric elements.

It is a further object of the present invention to provide a tool of the character described in which the piezoelectric element(s) is (are) protected from damage within a sealed interior chamber.

It is a further object of the present invention to provide a tool of the character described in which the piezoelectric element(s) is (are) multi-layer, pre-stressed composites.

It is a further object to provide a modification of the present invention in which the tool is pulled over the surface of the work material in a plurality of "stages", with each "stage" affecting only (or predominately) a portion of the total thickness of the work material.

Further objects and advantages of this invention will become apparent from a consideration of the drawings and ensuing description thereof.

DESCRIPTION OF THE PREFERRED EMBODIMENT

Figure 1:
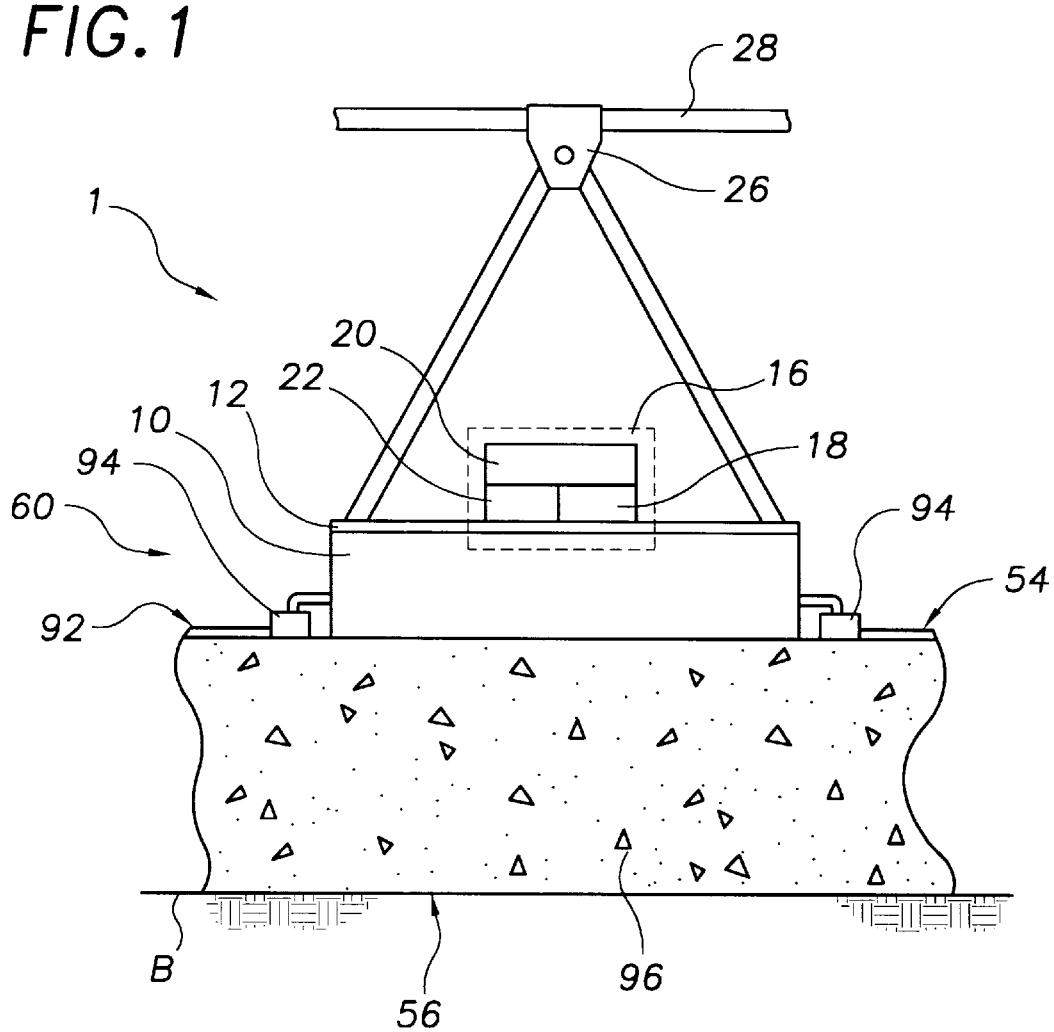
FIG. 1 is a schematic cross-sectional elevation illustrating a vibrator and concrete work material immediately prior to introduction of vibrations into the work material.

With initial reference directed toward FIG. 1 of the appended drawings a device for the smart vibration of a work material using piezoelectric vibrators embodying the principles and concepts of the present invention and generally designated by the reference numeral 1 will be described. For purposes of illustration only, the following disclosure will describe an application of the present invention wherein the acoustic energy generated by the device is advantageously used to affect the character of a concrete slab M.

As will be described more fully hereinbelow, the present invention is an apparatus and method for affecting the character of a plastic work material M (such as plastic concrete) using smart vibrations produced by piezoelectric actuators. In the following description vibrational energy is imparted into an uncured, plastic concrete mass M in a controlled fashion so as to affect (among other things) the "firmness" of the concrete mass. In this context, the terms "firm" and "firmness" refer to the degree of "solidity" of a mass when referring to any portion of the concrete mass which predominantly exhibits solid-like properties, and to the degree of "liquidity" when referring to any portion of the concrete mass which predominantly exhibits liquid like properties. It will be understood that increasing the firmness in any portion of the concrete mass which predominantly exhibits liquid-like properties corresponds to decreasing its "liquidity"; and increasing the firmness in any portion of the concrete mass which predominantly exhibits solid-like properties corresponds to increasing its "solidity".

Although a concrete mass M, when initially poured, is actually a mixture of solids (including cement, aggregates, etc.) and liquid (primarily water), the initially-poured concrete mass predominantly exhibits liquid-like properties and thus may be characterized as being a liquid. In this context the initially-poured concrete mass is understood to exhibit predominantly "liquid-like" properties because the mass, as a whole, flows, seeks its own level, has a single (substantially horizontal) free surface and may conform to the shape of a confining form.

For illustrative purposes only to corresponds to the moment of time immediately prior to introduction of vibrations into concrete mass M (as depicted in FIG. 1); $t_1$ corresponds to a moment of time during the vibrational process (later than to) when the transition zone L is approximately halfway between the bottom 56 of the concrete slab, and the top 54 of the concrete slab (as depicted by dimension D1 in FIG. 2); $t_2$ corresponds to a moment of time during the vibrational process (later than $t_1$) when the transition zone La is approximately two-thirds of the way from the bottom 56 of the concrete slab to the top 54 of the concrete slab (as depicted by dimension D2 in FIG. 3); and $t_3$ corresponds to the moment in time immediately after the introduction of vibrations (later than $t_2$) into concrete mass M (as depicted in FIG. 4).

FIG. 1 of the drawings illustrates the present invention adjacent a concrete mass (generally indicated M in the figures) which may be in the form of a slab as the concrete has been poured into a form (not shown) or the like from any suitable source onto a slab sub-base B. The concrete mass M typically includes aggregate, cement, water and other additives which may conventionally be employed in concrete slabs.

When the concrete mass M is initially poured, the aggregate, cement, water and other materials incorporated into the concrete are typically randomly distributed throughout the thickness of the concrete mass M between the sub-base B and the top surface 54 of the concrete slab, thus creating a non-homogeneous mixture. At the instant at which the concrete mass M is first poured, virtually none of the concrete mass is sufficiently consolidated, firm and dry enough for purposes of finishing the top surface 54 of the slab. (In this context, the word "finishing" is a term of art which refers to the way in which the surface of a concrete slab is smoothed.) Also, at the instant at which the concrete mass M is first poured, there typically exists variations in the moisture content and the degree of consolidation of the concrete mass M from one point to another over the entire volume of the concrete mass M. Such variation in consistency of poured concrete is not crucial to the operation of the present invention, but, as will be appreciated by those skilled in the art, is an inherent (and undesirable) property of randomly mixed concrete.

After the concrete mass M has been poured onto the sub-base B into the form of a slab, the weight of the aggregates (not shown) which comprise the concrete mass naturally push downward toward the sub-base B. The aggregates, being of relatively high density, begin to squeeze water and entrapped air out of the concrete mass M. Because there is more pressure near the bottom 56 of the slab than near the top 54 of the slab, more of the water and entrapped air is initially squeezed out of the concrete mass near the bottom of the slab than near the top of the slab, thus resulting in relatively more consolidated, relatively more firm and relatively drier concrete Ml near the bottom 56 of the slab, and relatively less consolidated, relatively less firm and relatively less dry concrete M2 nearer the top 54 of the slab.

Figure 2:
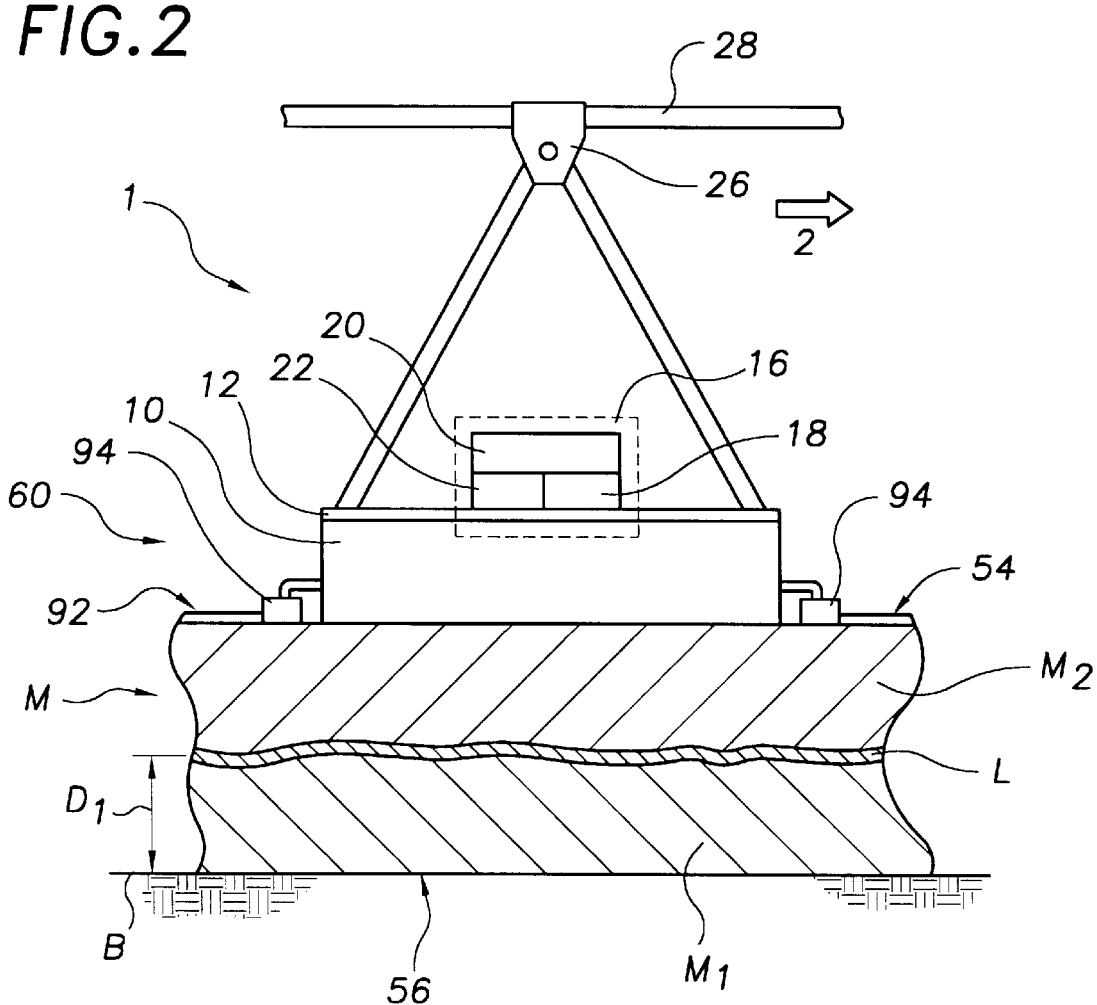
FIG. 2 is a schematic cross-sectional elevation illustrating a vibrator and concrete work material at a first time after introduction of vibrations into the work material.

The relatively less firm concrete mass M2, as illustrated in FIG. 2, may be characterized as having predominantly liquid-like properties. Furthermore, because (on average) the water-to-solids ratio in the ("liquid-like") concrete mass M2 decreases with increased depth below the top of the slab, (due to natural de-watering) the firmness of the (liquid) concrete mass M2 may be somewhat less firm nearer the top of the slab than nearer a transition zone L. The relatively more firm concrete mass M1, as illustrated in FIG. 2, may be characterized as having predominantly solid-like properties.

Referring now to FIG. 2, since the concrete mass M2 (i.e. above the transition zone L) is effectively a liquid-like material, and since the concrete mass M1 (i.e. below the transition zone) is effectively a solid-like material, the natural resonant frequency of the (liquid) concrete mass M2 above the transition zone L will, in most instances, be different from the natural resonant frequency of the (solid) concrete mass M1 below the transition zone. In this context, the "natural resonant frequency" or "resonant frequency" of the concrete refers to a frequency of a vibrational wave within a target volume of a work medium (i.e. concrete mass M) which is sufficient to establish a standing wave within the target volume of the work medium. In any event, whether the natural resonant frequencies of the (liquid-like) concrete mass M2 and the (solid-like) concrete mass M1 are identical or different, the speed of sound (i.e. the rate of propagation of vibrations) through the former will in all cases be different from (i.e. slower than) the speed of sound through the latter. In addition, due to the difference in the natural acoustical impedance between the (liquid-like) concrete mass M2 and the (solid-like) concrete mass M1, any mechanical vibration introduced directly into the (liquid-like) concrete mass M2 will predominately stay within the (liquid-like) concrete mass M2, and, accordingly, may have a much greater effect on the (liquid) concrete mass M2 than on the (solid-like) concrete mass M1.

Between the relatively more consolidated, relatively more firm and relatively drier (solid-like) concrete mass M1 near the bottom 56 of the concrete slab and the relatively less consolidated, relatively less firm and relatively less dry (liquid) concrete mass M2 nearer the top 54 of the slab, is a transition zone L. For purposes of understanding the present disclosure, the transition zone L may be interpreted as representing a boundary layer above which the concrete mass M2 exhibits liquid-like properties and below which the concrete mass M1 exhibits solid-like properties. In the transition zone L the average firmness gradient (i.e. the change in firmness divided by the change in elevation) is typically significantly greater than the average firmness gradients in the (solid-like) concrete mass M1 at the bottom of the slab and the (liquid) concrete mass M2 at the top of the slab. In practice the transition zone L may be either a relatively narrow layer (measuring, perhaps, only a millimeter thick) or a relatively thick zone, depending on the properties of the concrete mass and its environment.

For purposes of simplifying the explanation and understanding of the present invention, three sub-surface areas of the poured concrete mass M are referred to in this disclosure, namely the areas designated in the figures as M1, M2 and L. Although the concrete mass in each of these designated areas (M1, M2 and L) has individually definable physical properties (i.e. degree of consolidation, firmness, etc.), it should be understood that adjacent "layers" of the concrete mass are continuous, are intrinsically interconnected with each other, and together may form a single concrete slab.

Again referring to FIG. 2: A vibrator apparatus (generally designated 1 in the figures, and hereinafter referred to in its entirety as the "Apparatus") capable of introducing vibrations into the concrete mass M is positioned adjacent the top surface 54 of the slab. As the Apparatus 1 is activated, it introduces vibrations (at a first frequency) into the concrete mass M beneath the vibrator Apparatus 1, which causes water and air entrapped inside of the concrete mass M to migrate upwards toward the top surface 54 of the slab. The first frequency of vibration which is introduced into the concrete mass M may be advantageously preselected (based, for example, upon prior experience with concrete slabs having similar water content, similar thickness, similar aggregate size, etc.) to be within the range of natural resonance frequencies of the (liquid) concrete mass M2 which are typical for such newly poured slabs.

As the water and air migrate upward due to the vibrations, the depth of the relatively more consolidated, relatively more firm and relatively drier (solid-like) concrete mass M1 near the bottom 56 of the slab rises, and, correspondingly, the depth of the transition zone L across the slab also rises. It will be appreciated by those skilled in the art that as the depth of the relatively more consolidated, relatively more firm, relatively drier (solid-like) concrete mass M1 changes; and, as the thickness of the relatively less consolidated, relatively more wet (liquid) concrete mass M2 also changes. More specifically, as the thickness of the relatively less consolidated and relatively more wet (liquid) concrete mass M2 becomes thinner, its natural resonant frequency increases.

FIG. 2 illustrates the condition of the concrete slab, at time $t_1$, after the Apparatus 1 has begun its period of vibration of the concrete mass M. It will be understood that the volume of the sufficiently consolidated, sufficiently firm and sufficiently dry (solid-like) concrete mass M1 is greater after the period of vibration has begun (as indicated by dimension D1 in FIG. 2) than existed prior to the first stage of vibration.

Figure 3:
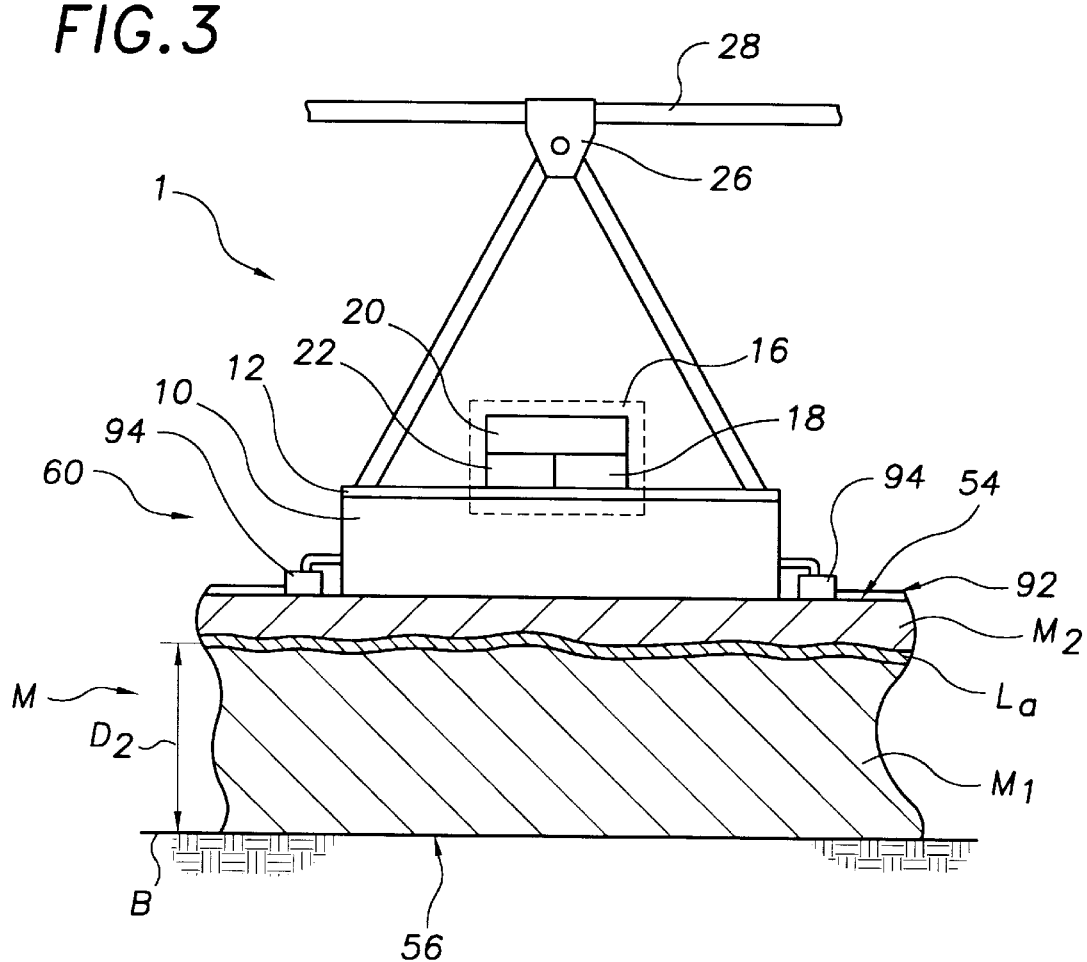
FIG. 3 is a schematic cross-sectional elevation illustrating a vibtator and concrete work material at a second time after the introduction of vibrations into the work material.
Figure 4:
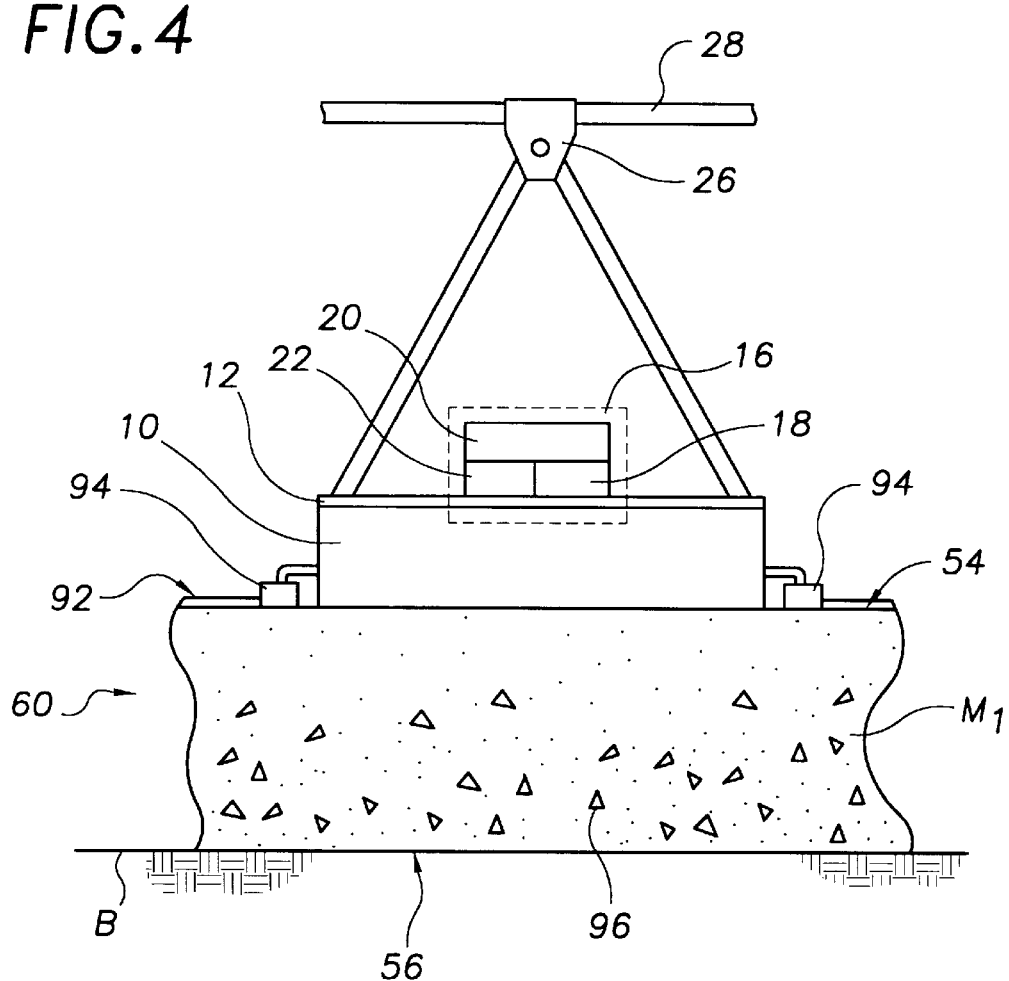
FIG. 4 is a schematic cross-sectional elevation illustating a vibrator and concrete work material at a third time after the introduction of vibrations into the work material.
Figure 5:
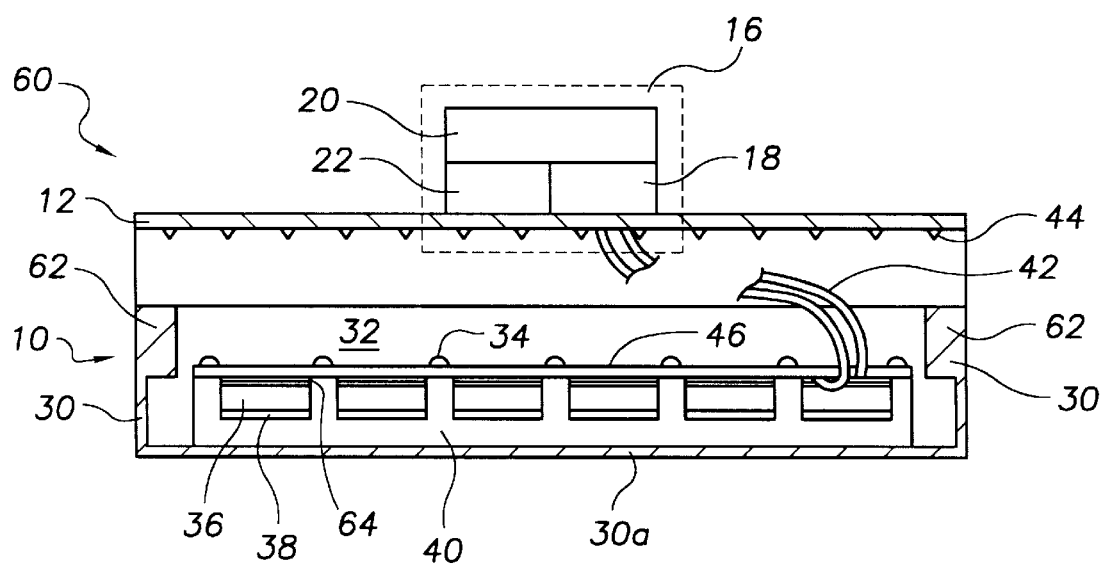
FIG. 5 is a cross-sectional side elevation of a portable vibrator apparatus constructed in accordance with the present invention.

FIG. 3 illustrates the condition of the concrete slab, at time $t_2$, further into the period of vibration of Apparatus 1. It will be understood that between time $t_1$ and time $t_2$, as the transition zone L rises, the natural resonant frequency of the relatively less consolidated, relatively less firm, relatively more wet (liquid) concrete mass M2 is continuously changing. Thus, as will be described further hereinbelow, the Apparatus 1 continuously changes its output to substantially correspond to the changing natural resonant frequency of the relatively less consolidated, relatively less firm, relatively more wet (liquid) concrete mass M2. Furthermore, it will be understood that the volume of the sufficiently consolidated, sufficiently firm and sufficiently dry (solid-like) concrete mass M1 is greater at time $t_2$ (as indicated by dimension D2 in FIG. 3) than existed at time $t_1$, (as indicated by dimension D1 in FIG. 2).

As illustrated in FIG. 3, shortly after the vibrator Apparatus 1 has completed a significant interval (time $t_2$) of its period of vibration of the concrete slab, the (solid-like) concrete mass M1 beneath the transition zone La has not only become deeper, but also somewhat more firm than was the case prior to vibration. The reason the depth of the (solid-like) concrete mass M1 increases after the Apparatus 1 has introduced vibrations is that, by vibrating the concrete mass, the upward migration of the excess water in the concrete mass is accelerated (relative to the rate of water migration which would naturally occur if left un-vibrated). It has been observed that when a liquid concrete mass (such as concrete mass M2) is vibrated, excess water which may be between the various solid constituents of the concrete mass (i.e. aggregate, cement, etc.) percolates upward toward the top of the surface of the slab at an accelerated rate so long as there is sufficient quantity of water in the vibrated concrete mass to separate the individual solid constituents from each other. In a sense, the excess water lubricates the solid constituents of the (liquid) concrete mass, giving the mass the characteristics of a liquid. When a sufficient amount of water is removed from the concrete mass, the water can no longer adequately lubricate the solid constituents of the concrete mass, and the individual solid constituents begin to mechanically "lock up" against one another. Once a sufficient amount of water has been removed from a portion of the concrete mass to allow the individual solid constituents to mechanically lock up against one another, that portion of the concrete mass begins to exhibit the characteristics of a solid.

Throughout the period of vibration of the concrete mass M the frequency of the vibrations introduced into the concrete mass is preferably set at a frequency corresponding to the natural resonant frequency of the relatively less consolidated, relatively less firm, relatively more wet (liquid) concrete mass M2. The vibrational energy is imparted to the plastic concrete mass M2 most effectively at the material's resonant frequency.

The control circuitry 16 preferably comprises an optimal frequency efficiency seeking circuit 22. The optimal frequency efficiency seeking circuit 22 provides a method for determining the most effective frequency at which to vibrate the tool. A discussion of said method follows. Initially, the natural/resonant frequency of the Apparatus 1 ($f_{n,a}$) in air must be determined. This is done by running the vibrator Apparatus 1 through a frequency range at a constant voltage. The frequency range chosen is preferably one within which the estimated resonant frequency ($f_{n,a}$) of the Apparatus will most likely be found. The results are then analyzed. It will be understood that the resonant frequency ($f_{n,a}$) of the Apparatus in air will most likely correspond to the frequency at which the power demand is at a minimum. The resonant frequency ($f_{n,a}$) of the Apparatus 1 in air may also, or alternatively, be determined by acoustically or optically measuring the frequency at which the Apparatus 1 vibrates in air at the greatest amplitude (for a fixed voltage input).

Next, the vibrator Apparatus 1 is placed in contact with the plastic concrete mass M. The natural/resonant frequency ($f_{n,s}$) of the entire system, (i.e. the vibrator apparatus 1 and the plastic concrete mass M combined), is determined. This is done by running the vibrator Apparatus 1 through a frequency range at a constant voltage while the Apparatus 1 is in contact with the concrete mass M. The frequency range chosen is preferably one within which the estimated resonant frequency ($f_{n,s}$) of the system will most likely be found. The results are then analyzed. It will be understood that the resonant frequency ($f_{n,s}$) of the Apparatus and concrete system will most likely correspond to the frequency at which the power demand is at a minimum for the vibrator Apparatus 1 when the Apparatus 1 is in contact with the concrete mass M. The resonant frequency ($f_{n,s}$) of the Apparatus and concrete system may also, or alternatively, be determined by acoustically or optically measuring the frequency at which the Apparatus 1 vibrates at the greatest amplitude (for a fixed voltage input) while in contact with the concrete mass M.

To find the resonant frequency of the plastic concrete mass M ($f_{n,c}$) alone, the resonant frequency of the vibrator Apparatus 1 ($f_{n,a}$) is subtracted from the resonant frequency of the system ($f_{n,s}$) The equation representing this method is:

$$f_{n,c} = f_{n,s} - f_{n,a}$$

By continuously adjusting the frequency of the vibrations to be introduced into the concrete mass during the period of vibration to correspond to the natural resonant frequency of the (liquid-like) concrete mass M2 which is above the transition zone, the amount of energy necessary to sufficiently vibrate the (liquid-like) concrete mass M2 to cause consolidation and upward migration of water can be minimized. Also, as will be appreciated by those skilled in the art, because the resonant frequency of the relatively more consolidated (solid-like) concrete mass M1 below the transition zone in most cases significantly differs from the resonant frequency of the (liquid-like) concrete mass M2 above the transition zone, and because of the difference in the acoustic impedance between the (liquid) concrete mass M2 and the (solid-like) concrete mass M1, the Apparatus-introduced vibrations will have more effect (i.e. will cause more severe vibration, and, therefore, more particle consolidation and water migration) within the (liquid) concrete mass M2 near the top of the slab than within the (solid-like) concrete mass M1 near the bottom of the slab. Thus, by introducing vibrational energy into the (liquid) concrete mass M2, at or near the natural resonant frequency of the (liquid) concrete mass M2, it is possible to minimize the amount of vibrational energy which is required to effect the desired consolidation of the constituent solids of the concrete mass (because vibrating the concrete mass at or near its resonant frequency produces more amplitude with less energy than at other frequencies which are less efficient).

The cover plate 12 is preferably made of a lightweight thin metal (such as aluminum) which will readily deform when subjected to vibrations in the manner set forth herein below. This allows any vibrations which may be inadvertently transmitted to the cover plate 12 from the base 10 to be dissipated in the cover plate 12, rather than being further transmitted to the mechanisms attached to the cover plate 12. The cover plate 12 has a series of screws 44 around its perimeter by which the cover plate 12 is secured to the base 10 of the transducer assembly 60.

The base 10 comprises an outer shell 30 which is preferably made of a lightweight electrically insulating material such as nylon, or which may alternatively be made of other insulating materials such as PVC, or made of electrically conductive materials such as a thin metal. By way of example only, in the preferred embodiment of the invention, the base 10 may be approximately 3.75" wide× approximately 12.5" long×approximately 1" high. The nylon shell 30 is hollow and surrounds an interior cavity 32. The sides 30b of the shell 30 are semi-rigid, and the blade 30a (bottom) of the shell is very thin (preferably 0.040" to 0.060" inches), allowing for its controlled deformation. The material used to make the blade 30a must be sufficiently flexible that it can deform in a substantially vertical direction when exposed to vertical forces from actuators 36 located within the cavity 32. Around the sides of the shell 30 is a rib 62 with a series of tapped holes 66 for engagement with screws 44 which are used to attach the top piece 12 to the outer shell 30.

Figure 6:
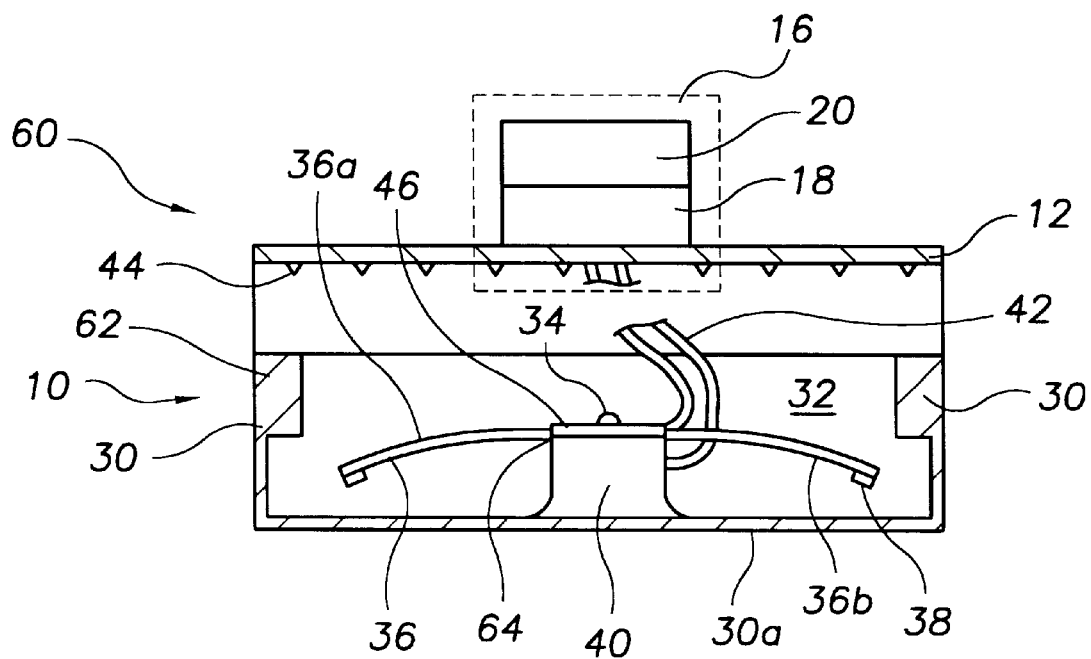
FIG. 6 is a cross-sectional front elevation of the portable vibrator apparatus shown in FIG. 5.
Figure 7:
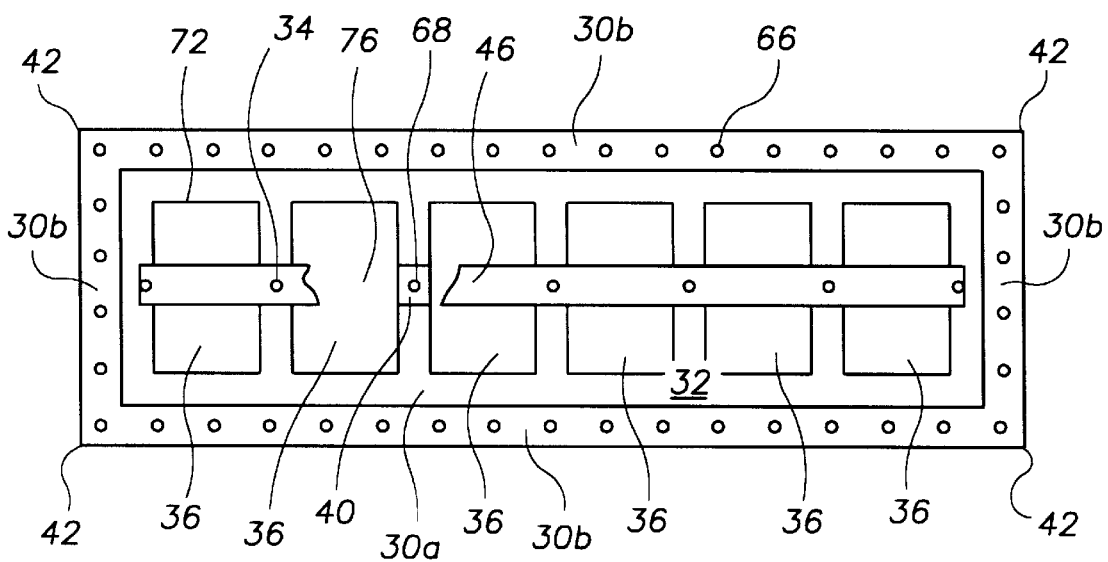
FIG. 7 is a plan view of the portable vibrator apparatus in FIG. 5, shown with its cover plate and handle removed.

Running longitudinally along the middle of the shell 30, inside of the base 10, is another rib 40. In the preferred embodiment of the invention the rib 40 is made of Phenolic. This rib 40 is attached to the blade 30a of the shell 30 by a conventional method such as gluing (not shown). Attached to this rib 40 is a series of approximately six prestressed piezoelectric ceramic actuator elements 36. The actuator elements 36 are aligned along the rib 40 in an equally spaced manner. Each actuator element 36 straddles and is secured to the rib 40 with the normally concave face 36b of the actuator element 12 directed downward, as illustrated in FIG. 6. In a modification of the invention the actuator elements 36 may be secured to the rib with their normally concave faces 36b directed downward. Preferably, each actuator element 36 is placed in a recess or notch 64 in the rib 40. The actuator elements 36 are held in place by a bar 46 which is approximately the same length and width of the rib 40 and which is placed over the actuator elements 36 and secured to the rib 40 with screws 34 at holes 68 tapped between the actuator elements 36. This bar 46 is preferably made of an insulating material. Preferably, the shell 30 has square corners, however, it may alternatively have rounded corners to allow the Apparatus 1 to move over the concrete more easily and prevent buildup of water and slurried concrete in front of the moving Apparatus 1 as it moves across the surface of the plastic concrete.

The blade 30a of the transducer assembly 60 must be made of a flexible material in order to optimize the transmission of vibrational energy through the blade 30a to the concrete C. Flexibility is an advantageous characteristic because it allows use of a material (e.g. nylon) that is lighter, easier to assemble and more cost-effective than the thick, more rigid materials, (such as steel plate), used in prior vibrating tools.

In the preferred embodiment of the present invention, nylon is used. A further advantage of using a flexible material is that it lends itself to the use of electrically insulating materials (such as nylon). It will be appreciated that by constructing the base 10 out of an electrically insulating material, the possibility of accidently shorting the electrical circuit to the actuator elements 36 is minimized.

Figure 8:
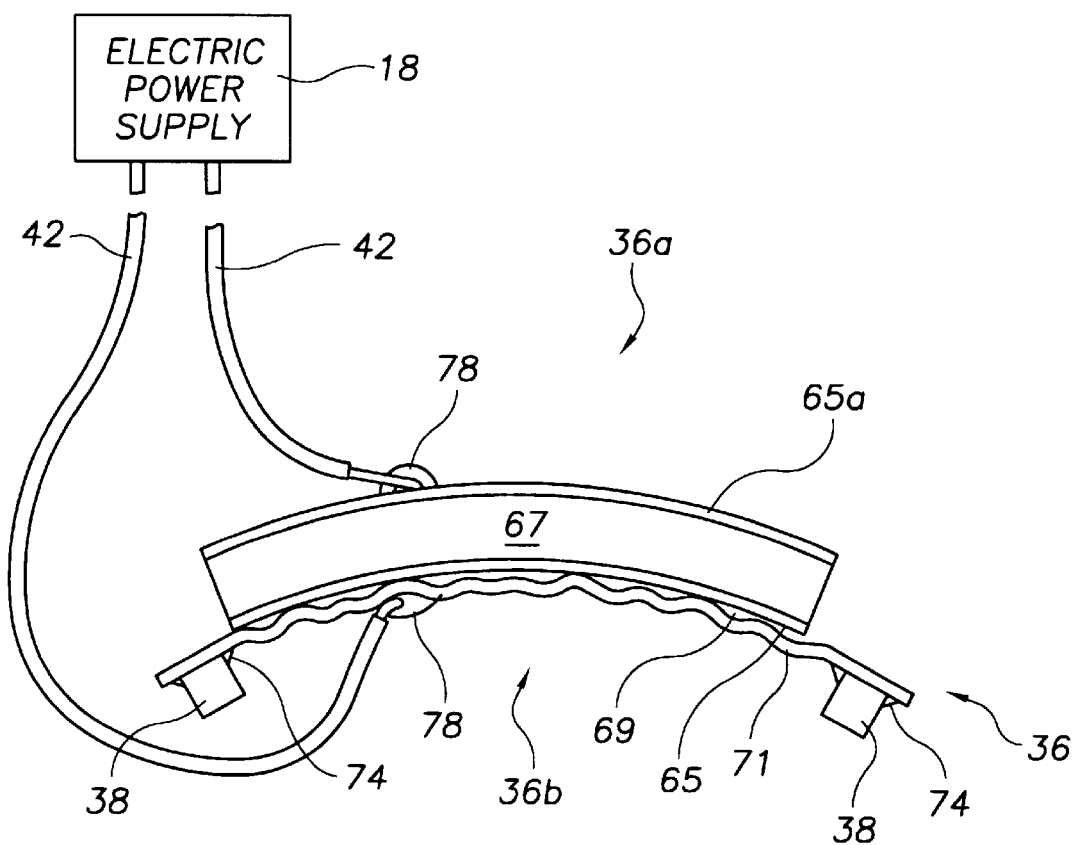
FIG. 8 is an elevation view showing an actuator element with weights attached thereto and constructed in accordance with the present invention.

As illustrated in FIG. 8, connected at opposite ends of the actuator elements 36 is a small weight 38. Each weight's 38 height is preferably the same as its width and its length is preferably the same as the width of the actuator element 36. The weight 38 may be attached to the actuator element 36 by solder 74, glue or similar means (not shown). By attaching the weights 38 to the ends of an actuator element 36, the magnitude of the momentum which can be developed by oscillating the actuator element 36 at any given frequency can be increased by an amount which is approximately proportional to the mass of the attached weights 38. It will be understood that, in order to transmit a given amount of vibrational energy from an oscillating actuator element 36 to the blade 30a of the shell 30 (and thence to the work surface of a concrete mass M), a lower frequency of oscillation is required for an actuator element having weights 38 attached in the manner described than would be required of an actuator element 36 alone.

Accordingly, it will be appreciated that by constructing the actuator element 36 and weights 38 in accordance with the foregoing description, and applying electrical energy to the actuator elements 36 at a frequency corresponding to a natural frequency of oscillation of the combined actuator element 36 and attached weights 38, the magnitude of vibrational energy which can be generated and transmitted to the work surface of a plastic concrete mass M can be maximized while the amount of electrical energy input necessary to generate the vibrational energy output is minimized.

Each actuator element 36 has a wire 42 attached to each electrode (not shown). These wires 42 are also attached to an external common power supply 18. Electricity may be provided to each actuator element 36 by parallel wires 42 attached to corresponding electrodes (not shown) or the various actuator elements 36 may be connected in series. In a modification of the present invention, the top of the rib 40 and the bar 46 are each made of a conductive material to which the wires 42 are attached. In this modification of the invention the rib 40 and bar 46 each function as an electrical bus, obviating the attachment of wires to each actuator element 36. This cuts down on the amount of wires 42 that have to be used.

Figure 11:
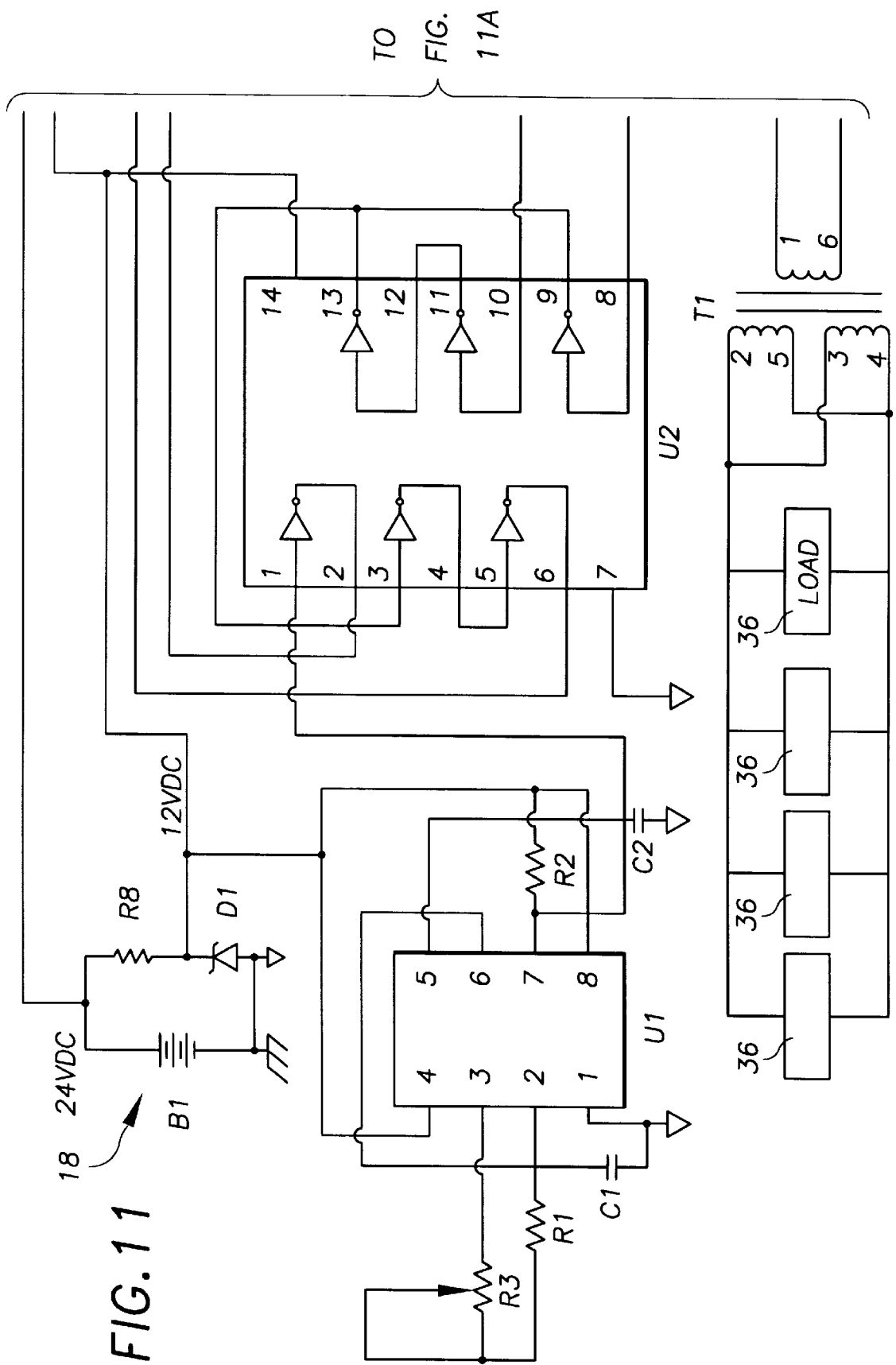
FIGS. 11 and 11A are schematic diagrams of a regenerative electric circuit configured in accordance with the present invention.
Figure 11A:
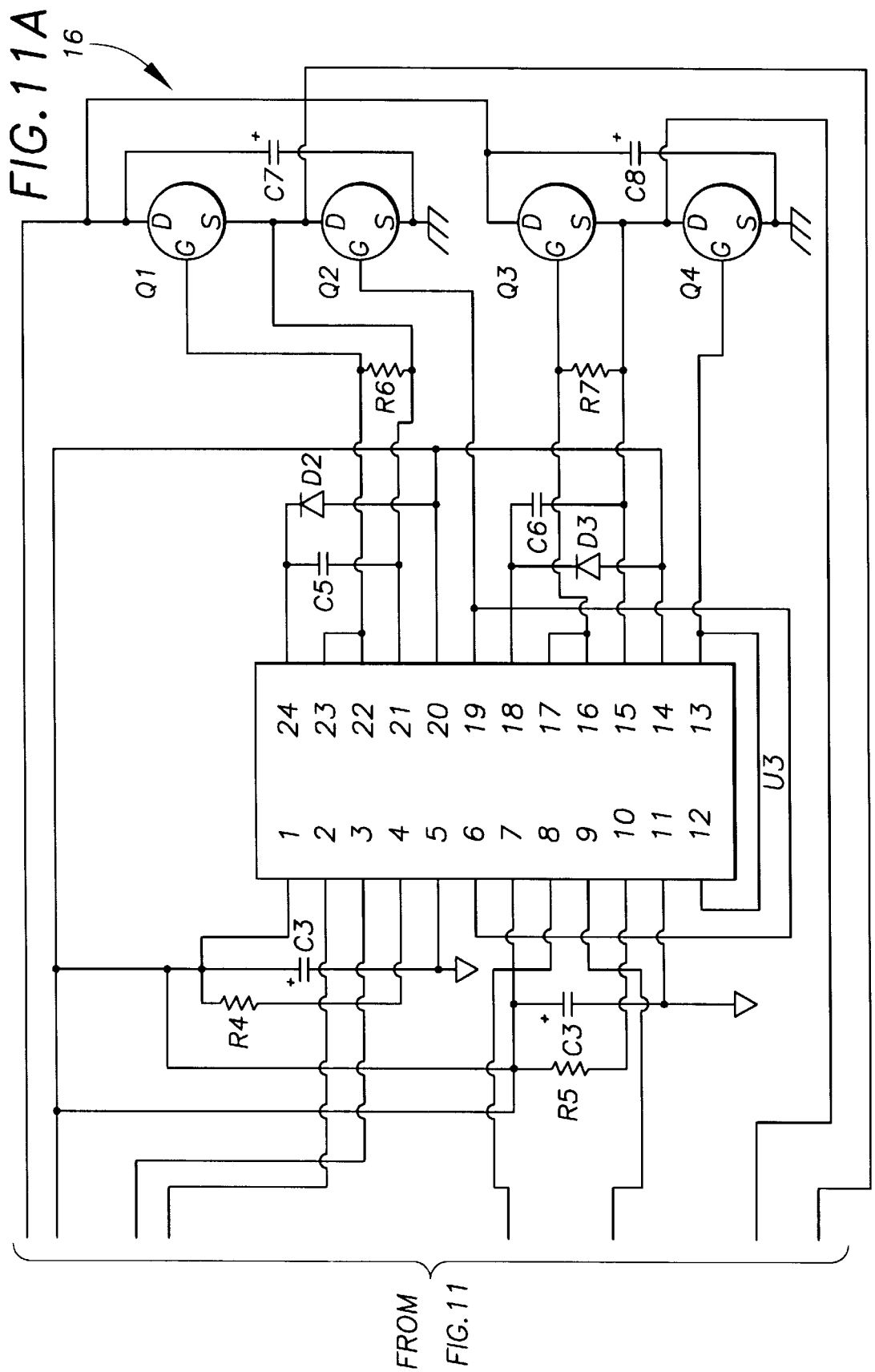
Figure 12:
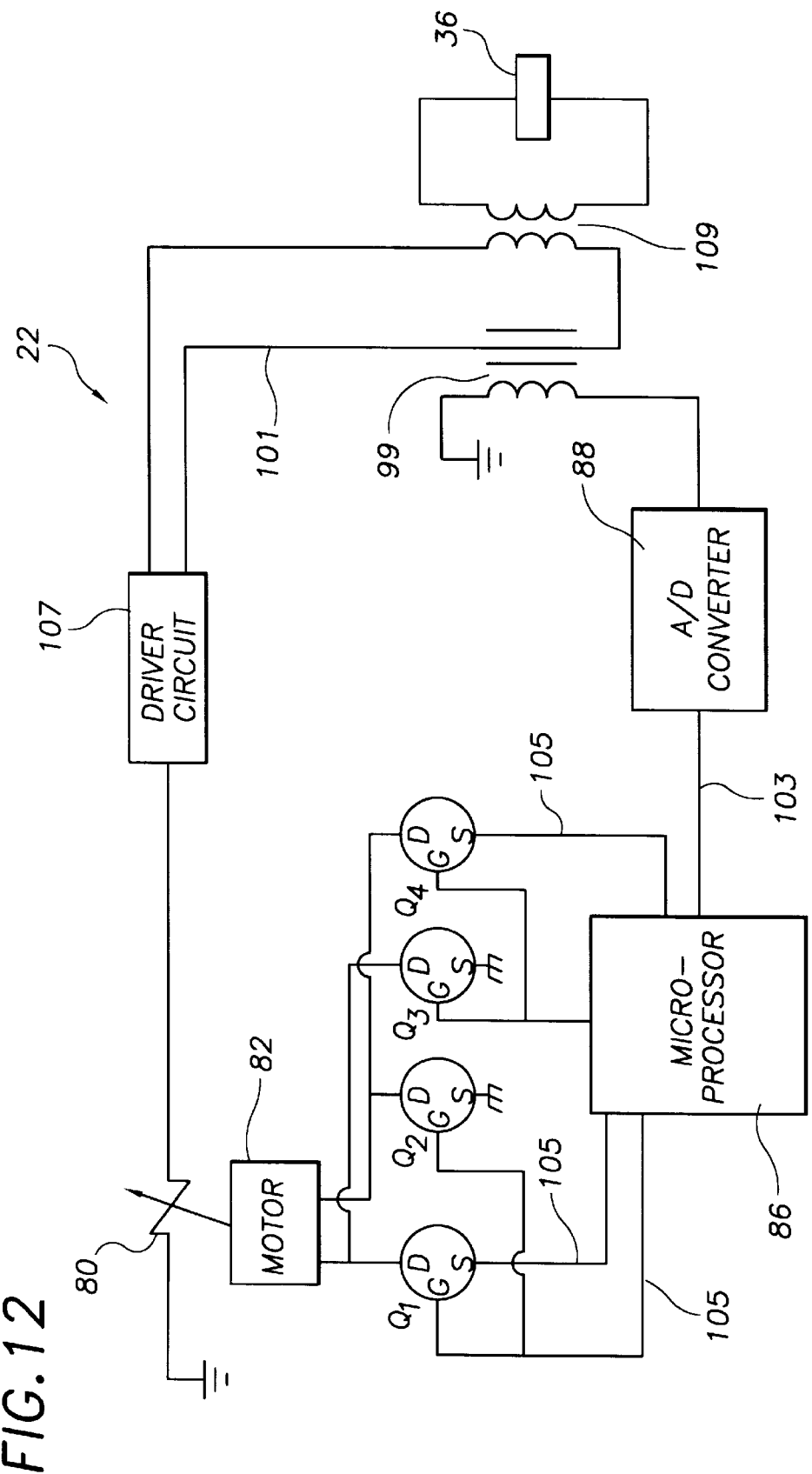
FIG. 12 is a schematic diagram of an optimal frequency seeking circuit configured in accordance with the present invention.

The control circuitry 16 preferably comprises a regenerative electric circuit 20, such as that illustrated in FIG. 11, and a power supply 18. As will be explained more fully below, the regenerative electric circuit 20 optimizes the electrical-to-mechanical energy conversion efficiency of each actuator element 36 by supplementing electric power supplied to the device from the batteries or the like (not shown) with piezoelectrically generated electricity produced by the mechanical deformation of the actuator element 36.

The actuator element 36 is a flextensional piezoelectric transducer. Various constructions of flextensional piezoelectric transducers may be used (including, for example, "moonies", "rainbows", and other unimorph, bimorph, multimorph or monomorph devices, as disclosed in U.S. Pat. No. 5,471,721 or "THUNDER", as disclosed in U.S. patent application Ser. No. 08/416,598) but the actuator element 36 preferably comprises a pre-curved piezoelectric actuator as disclosed in co-pending application Ser. No. 08/797,596 constructed in accordance with the following description.

In the preferred embodiment of the invention the actuators 36 are composite structures such as is illustrated in FIG. 8. Each actuator 36 is preferably constructed with a curved PZT piezoelectric ceramic layer 67, having a normally convex face 67a and a normally concave face 67b, which is electroplated 65 and 65a on its two opposing faces. A steel, stainless steel, beryllium alloy or other metal pre-stress layer 71 is adhered to the electroplated 65 surface on one side of the ceramic layer 67 by an adhesive layer 69. The adhesive layer 69 is preferably LaRC-SI™ material, as developed by NASA-Langley Research Center and commercially marketed by IMITEC, Inc. of Schenectady, N.Y. In a modification of the invention a second adhesive layer, also preferably comprising LaRC-SI™ material, may be adhered to the opposite side of the curved ceramic layer 67 along with a second metal pre-stress layer. During manufacture of the actuator 36 the curved ceramic layer 67, the adhesive layer 69 and the pre-stress layer 71 are simultaneously heated to a temperature above the melting point of the adhesive material, and then subsequently allowed to cool, thereby re-solidifying and setting the adhesive layer 69. During the cooling process the curved ceramic layer 67 becomes compressively stressed, due to the higher coefficient of thermal contraction of the material of the pre-stress layer 71 and the adhesive layer 69 than for the material of the curved ceramic layer 67. One or more additional pre-stressing layer(s) 71 may be similarly adhered to either or both sides of the ceramic layer 67 in order, for example, to increase the stress in the ceramic layer 67 or to strengthen the actuator 36.

Electrical energy may be introduced to the piezoelectric actuator 36 from an electric power supply 18 by a pair of electrical wires 42 attached to opposite sides of the actuator 36 in communication with the electroplated 65 and 65a faces of the curved ceramic layer 67. As discussed above, the pre-stress layer is preferably adhered to the ceramic layer 67 by LaRC-SI™ material. The wires may be connected (for example by glue or solder 78) directly to the electroplated 65 and 65a faces of the curved ceramic layer 67, or, in a modification of the invention with pre-stress layers 71 on both sides they may alternatively be connected to the pre-stress layers 71. LaRC-SI™ is a dielectric. When the wires 42 are connected to the pre-stress layers 71, it is desirable to roughen the face of the pre-stress layers 71, so that the pre-stress layers 71 intermittently penetrate the adhesive layers 69, and make electrical contact with the respective electroplated 65 and 65a faces of the curved ceramic layer 67.

As discussed above, in the preferred embodiment of the invention weights 38 are adhered to the actuator 36 at opposite ends of the pre-stress layer 71. In the preferred embodiment of the invention the weights 38 are adhered to the normally convex face 36a of the actuator (as illustrated in FIG. 8), but they may alternatively be adhered to the normally concave face 36b of the actuator. To facilitate fastening of the weights 38 to the pre-stress layer 71, and to increase the bending moment provided by the weights 38, tabs 71a extending beyond the corresponding ends of the curved ceramic layer 67 are provided at opposite ends of the pre-stress layer 71.

It will be appreciated by those skilled in the art that by using an actuator element 36 comprising a pre-stressed piezoelectric element the strength, durability, and piezoelectric deformation (i.e. output) are each greater than would normally be available from a comparable piezoelectric element which is not pre-stressed. Accordingly, in the preferred embodiment of the invention it is desirable to employ actuator elements 36 comprising pre-stressed piezoelectric elements; however, non-pre-stressed piezoelectric elements may alternatively be used in modified embodiments of the present invention.

By way of example only, each piezoelectric actuator 36 may be approximately 1.4" wide×2.0" long, and between 0.005" and 0.030" thick. The actuator elements 36 may be spaced approximately 0.5" apart and are sealed within the interior cavity 32 to protect them from damage. The spacing of the actuator elements 36 allows for uniform vibration along the blade 30a.

When energized by an alternating current in the manner described above, the actuator elements 36 (together with the weights 38) vibrate in a "wing-flapping" manner. The ends 72 of the actuator elements 36 vibrate up-and-down in a substantially vertical direction while the centers 76 of the actuator elements 36 remain substantially stationary against the longitudinal rib 40. The vibrational energy from this "wing flapping" motion of the actuator elements 36 is then transferred through the rib 40 and into the blade 30a. The rib 62 running along the sides of the shell 30 is constructed of sufficiently thick and rigid material that when the vibrational energy is applied to it from the actuator elements 36, the blade 30a of the tool readily deforms, thereby transferring almost all of the vibrational energy directly to the plastic concrete mass M which is in contact with the blade 30a of the transducer assembly 60. Because of these characteristics almost no vibration is transferred into the handle making the tool very easy and comfortable to use.

Because the "wing flapping" motion of the actuator elements 36 are principally along vertical axes, the blade 30a of the base of the trowel predominantly oscillates in an up-and-down motion. For example, the blade 30a of the base 10 of a vibrating tool constructed in accordance with the materials and dimensions described above may typically oscillate "up-and-down" approximately 0.010" or less; and any displacement of the sides 30b of the tool in the horizontal plane would typically be less than one-thousandth of an inch. As will be appreciated by those skilled in the art, because there is virtually no horizontal displacement or deformation of the sides 30b of the tool, and because the tool is relatively small and light-weight it is very easy to handle and is useful for working near edges and corners.

Referring now to FIG. 11: The preferred embodiment of the invention comprises a regenerative electric circuit 20 in which the amount of electrical energy required to generate the desired mechanical vibrations are minimized, piezoelectrically generated electrically energy is recovered, the actuator elements 36 are prevented from over-heating, and the electrical-to-mechanical energy conversion efficiency of the actuator elements are maximized. An explanation of this preferred regenerative electrical circuit 20 follows: Active loads are loads which are capable of returning energy into the output of the source driving the load. A piezoelectric transducer is an example of an active load. A piezoelectric transducer produces a potential difference (voltage) across itself when forced to expand or contract. Piezoelectric transducers have elements of resistance, capacitance, and inductance. Since both capacitors and inductors are energy storage devices, some of the energy driving the transducer is stored within the piezoelectric transducer.

Voltage is stored within the capacitive element of the piezoelectric transducer. This stored source voltage adds to the potential difference created by the expanded (or contracted) transducer, thus causing an elevated voltage which significantly increases with time and renders such a system unstable. This elevated voltage may be dissipated either by returning energy to the source or internally dissipating electrical energy across the resistive element of the transducer. Prior art includes a circuit which dissipates the elevated voltage when it exceeds a threshold by dropping the voltage across a Zener diode, making an inefficient use of the stored energy.

The elevated voltage creates problems when active loads are driven for even short periods of time (i.e. a few minutes). For example, as piezoelectric transducers are driven, the stored voltage increases with each successive expansion or contraction of the piezoelectric transducer. Eventually, the voltage either exceeds the source's capability to absorb the excess voltage, causing source failure, or the dielectric constant of the piezoelectric transducer is exceeded, resulting in the "arcing" and eventual "shorting" of the transducer. Excessive heat is also generated within the transducer as a result of this elevated voltage being dissipated across the resistive element within the piezoelectric transducer.

The present invention comprises a regenerative electric circuit 20 for piezoelectric transducers. The piezoelectrically generated electrical energy is captured, stored, and returned to the source voltage in a manner such that very little energy is necessary to expand (or contract) the transducer (e.g. actuator element 36). This circuit reduces the internal heat of the piezoelectric transducer (e.g. actuator element 36) by removing both the generated and stored potential differences of the piezoelectric transducer. Cooling the transducer in this manner yields a higher electrical-to-mechanical conversion efficiency of the actuator element 36 itself, thus lowering the amount power necessary to drive the load. The circuit also increases the life of the power supply by regulating energy returned to it.

FIG. 11 illustrates an electric schematic of the regenerative 2 electric circuit 20. A battery B1 supplies 24 VDC to the electric circuit 20. A resistor R8 drops the source voltage to 12 VDC so that it can be used by integrated circuit chips U1, U2, and U3. Chip U1 is a CMOS timer chip which converts the direct current source voltage from battery B1 into a square wave. The frequency of the square wave produced by U1 may be varied by changing the value of the potentiometer R3. The square wave output from U1 is connected to the inputs of several Schmitt triggered inverters located in chip U2. These inverters have faster switching capabilities than regular inverters, thus peak rise times are faster resulting in a more square wave output. Schmitt inverters also reduce noise chattering at high frequencies.

Chip U2 produces two output signals. One signal is the inverse of the other. These two signal outputs, from pins 2, 6, 8, and 10 on chip U2, are connected to driver input pins 2, 3, 9, and 8 on the driver chip U3, respectively. The U3 chip controls the switching of four Metal Oxide Semiconductor Field Effect Transistors (MOSFETs), Q1–Q4. Driver input pins 2 and 9 are provided with inverted signals, while driver input pins 3 and 8 are provided with uninverted signals, thus creating a switching sequence which turns Q1 and Q2 "off" while Q3 and Q4 are "on", respectively. The switching sequence allows current from the battery to be alternated within the transformer. The alternating current is then "stepped up" to the "operating voltage" of the load using a transformer, T1. In this embodiment, T1 is a 4.1:1 ratio transformer, which steps the 24 volts provided by the battery B1 to 200 volts peak to peak. The "operating voltage" is simply the amount of voltage necessary to deform the load (piezoelectric actuator element 36).

The MOSFETS, Q1–Q4, help provide the regenerative capability of the circuit. Their switching sequence allows the load the ability to dissipate energy by reversing the process discussed in the previous paragraph. Voltage stored within the load is "stepped down" and returned to the battery B1, resulting in an efficient use of energy stored and produced by the load (e.g. actuator element 36).

Figure 9:
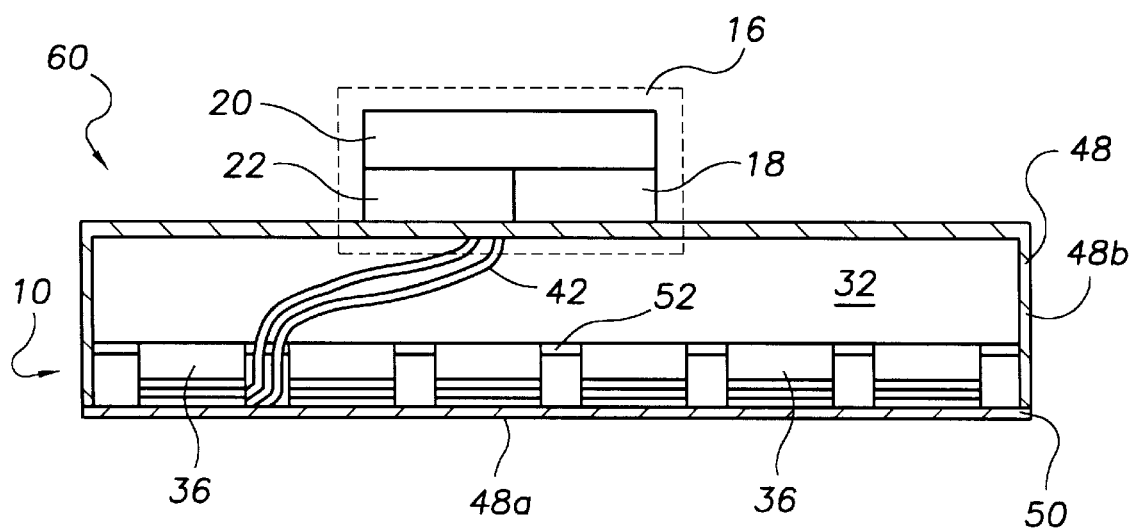
FIG. 9 is a cross-sectional side elevation of a portable vibrator apparatus constructed in accordance with a modification of the present invention.
Figure 10:
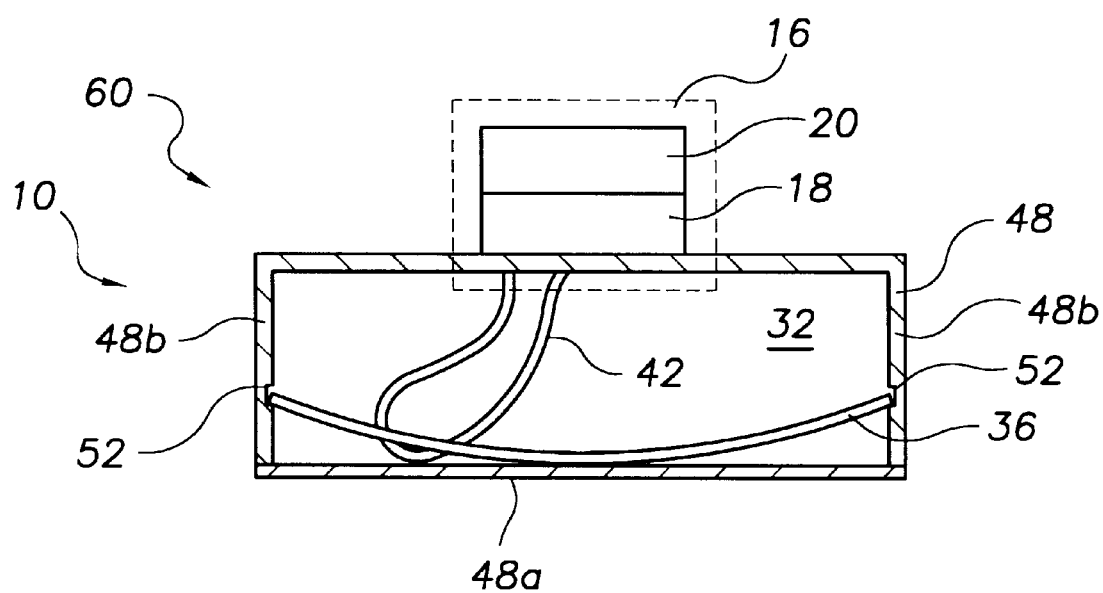
FIG. 10 is a cross-sectional front elevation of the portable vibrator apparatus shown in FIG. 9.

Referring now to FIGS. 9 and 10: In a modification of the present invention, actuator 36 is disposed within inner cavity 32 with its normally concave face 36b directed upwards, and its normally convex face 36a directed downward, and in contact with the blade 48a. The ends of actuator 36 are disposed within notches 52 located on the sides 48b of the outer shell 48. The notches 52 contain the ends of the actuator 36, allowing only the middle of the actuator 36 to move when the actuator 36 is deformed. The normally convex face 36a of the actuator 36 is in mechanical communication with the blade 48a, thus causing the blade 48a to oscillate at substantially the same frequency as the actuator 36 when energized.

It will be understood from the above description that actuator elements 36 used in the present invention are very lightweight and comprise very few parts. Therefore, maintenance costs for the device are kept at a minimum. These characteristics are advantageous when compared to the bulk and intricacy of the motors, solenoids, etc., that are used in prior vibrating tools.

While the above description contains many specificities, these should not be construed as limitations on the scope of the invention, but rather as an exemplification of one preferred embodiment thereof. Many other variations are possible, for example:

The actuators 36 may be normally curved when non-energized, or they may alternatively be normally flat when non-energized, and, if normally, flat, may be secured to the rib 40 with either face directed upward;

The rib 40 may be replaced with a series of individual bosses to which individual actuators may be attached;

The weights 38 may be removed to allow the actuator elements 36 to vibrate on their own;

The weights 38 may alternatively be secured to the actuator elements a finite distance inboard of the edge of the actuator element, and the weights need not necessarily be square or rectangular in cross-section;

The actuators may be arranged into various arrays, and need not necessarily be located in a single line down the middle of the base of the tool;

The tool may be used to vibrate or affect plastic/slurry mixtures other than concrete (e.g. coal slurries, wastewater sludge, pharmaceutical sludge, plaster, wet soil, etc.);

The rib 40 may be carved out of or molded to the base 10 instead of being a completely separate piece;

The number of actuators may vary;

Accordingly, the scope of the invention should be determined not by the embodiment illustrated, but by the appended claims and their legal equivalents.

We claim:

1. A method of applying controlled vibrations to a work material comprising the steps of:

vibrating a transducer assembly in air to determine a natural resonant frequency of said transducer assembly;

selecting a work material comprising a liquid and a solid;

introducing into said work material a first series of vibrations by said transducer assembly;
said first series of vibrations ranging in frequency from a first frequency to a second frequency;
determining a natural resonant frequency of a first system, said first system comprising said work material and said transducer assembly;
wherein said natural resonant frequency of said first system is between said first frequency and said second frequency;

determining a natural resonant frequency of said work material by subtracting said natural resonant frequency of said transducer assembly from said natural resonant frequency of said first system;

introducing into said work material a second series of vibrations at said natural resonant frequency of said work material.

2. The method according to claim 1;

wherein said step of introducing into said work material a second series of vibrations at said natural resonant frequency of said work material causes upward migration of excess liquid in said work material to provide a first segment of said work material located beneath said transducer assembly to contain a relatively higher liquid concentration than a second segment of said work material located beneath said first segment of said work material;

further comprising introducing into said first segment of said work material a third series of vibrations by said transducer assembly;
said third series of vibrations ranging in frequency from a third frequency to a fourth frequency;
determining a natural resonant frequency of a second system, said second system comprising said first segment of said work material and said transducer assembly;
wherein said natural resonant frequency of said second system is between said third frequency and said fourth frequency;

and further comprising determining a natural resonant frequency of said first segment of said work material by subtracting said natural resonant frequency of said transducer assembly from said natural resonant frequency of said second system;

and further comprising introducing into said work material a fourth series of vibrations at said natural resonant frequency of said first segment of said work material;
said fourth series of vibrations causing upward migration of excess liquid in said first segment of said work material to provide a third segment of said work material to contain a relatively higher liquid concentration than a fourth segment of said work material located beneath said third segment of said work material.

3. The method according to claim 2;

wherein said step of determining a natural resonant frequency of said first system comprises measuring an electrical energy draw of said transducer assembly concurrent with said step of introducing into said work material a first series of vibrations by said transducer assembly; and
determining a measurable minimum of said electrical energy draw of said transducer assembly;
whereby said natural resonant frequency of said first system corresponds to said measurable minimum of said electrical energy draw of said transducer assembly.

* * * * *